(12) United States Patent
McGovern et al.

(10) Patent No.: US 6,672,544 B2
(45) Date of Patent: Jan. 6, 2004

(54) SATELLITE HARMONIC TORQUE ESTIMATOR

(75) Inventors: Lawrence McGovern, Mountain View, CA (US); Xen Price, Redwood City, CA (US)

(73) Assignee: Space Systems/Loral, Palo Alto, CA (US)

(*) Notice: Subject to any disclaimer, the term of this patent is extended or adjusted under 35 U.S.C. 154(b) by 94 days.

(21) Appl. No.: 10/087,279

(22) Filed: Mar. 1, 2002

(65) Prior Publication Data

US 2003/0164429 A1 Sep. 4, 2003

(51) Int. Cl.[7] ............................................. B64G 1/36
(52) U.S. Cl. ..................................... 244/171; 701/13
(58) Field of Search ............................... 244/167, 171; 701/13; 342/352, 356

(56) References Cited

U.S. PATENT DOCUMENTS

| | | | |
|---|---|---|---|
| 5,540,405 A | * | 7/1996 | Bender et al. .............. 244/166 |
| 5,610,820 A | * | 3/1997 | Shankar et al. ............... 701/13 |
| 6,354,163 B1 | * | 3/2002 | Heiberg ........................ 74/5.47 |
| 2002/0148930 A1 | * | 10/2002 | Yamashita .................. 244/169 |

* cited by examiner

Primary Examiner—Robert P. Swiatek
(74) Attorney, Agent, or Firm—Perman & Green, LLP

(57) ABSTRACT

A spacecraft embedded in a reference frame rotating relative to inertial space. The spacecraft generally includes actuators for maneuvering the spacecraft with respect to the reference frame, an attitude measurement device that measures the pitch and roll attitude of the spacecraft with respect to the reference frame, a control device adapted to keep the roll and pitch angles of the spacecraft close to the commanded roll and pitch angles, and a harmonic torque estimator adapted to read the commanded angular velocity of the spacecraft relative to an inertial frame, read momentum wheel speeds, read known predicted external torques and combine angular velocity, measured wheel speed and known external torque to produce an estimated observable periodic torque.

23 Claims, 9 Drawing Sheets

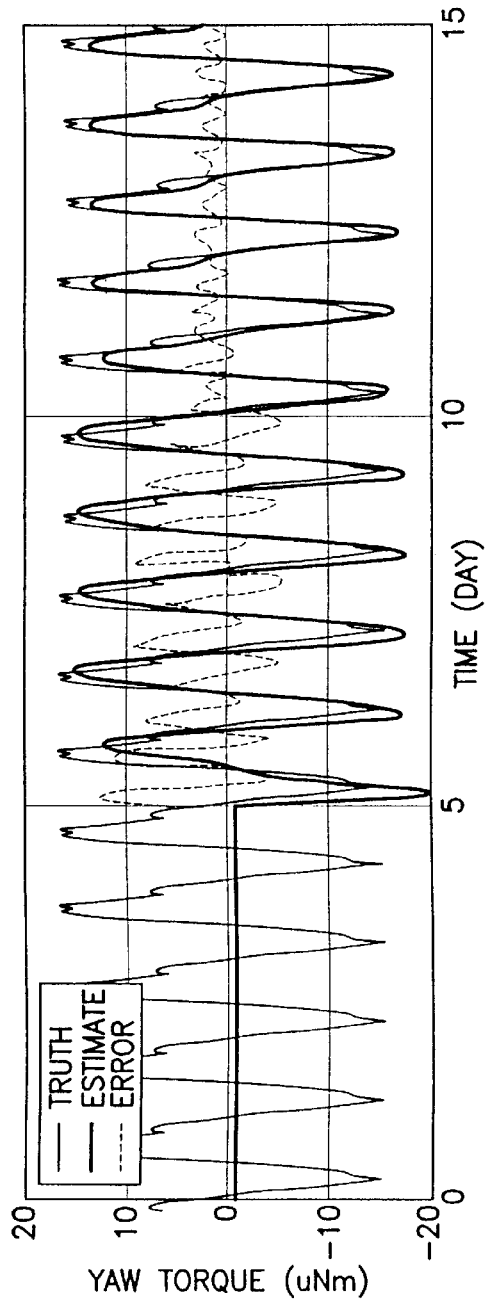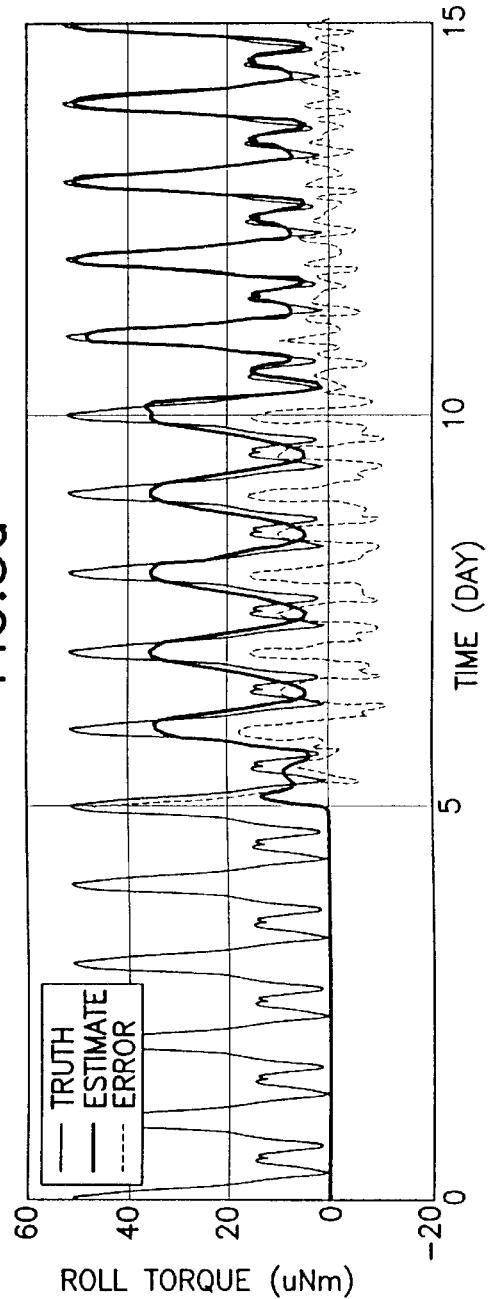

SATELLITE HARMONIC TORQUE ESTIMATOR

BACKGROUND OF THE INVENTION

1. Field of the Invention

The present invention relates generally to spacecraft attitude control systems and in particular to estimating periodic disturbance torques acting on an orbiting spacecraft.

2. Brief Description of Related Developments

Orbiting spacecraft are typically subjected to a periodic disturbance torque environment large enough to perturb the spacecraft from its desired attitude. The effects of this periodic disturbance torque environment could be mitigated if the disturbances can be accurately predicted or estimated. Solar torques represent the dominant periodic disturbance environment on an Earth-pointing satellite, with a period equal to the spacecraft solar day(e.g., twenty-four hours for a geosynchronous satellite). There is also a large component caused by the inertia mass properties of the spacecraft. These torques are generally dominated by constant body-fixed torques and signals at orbit rate and twice orbit rate.

Feedback control algorithms are highly effective at mitigating these disturbances given the right sensors. Most orbiting spacecraft employ Earth sensors, which provide continuous measurements of roll and pitch. Coupling these measurements with an appropriate set of actuators, such as momentum wheels and/or thrusters, the roll and pitch angles may be kept close to commanded roll and pitch angles using well established feedback control techniques. However, continuous measurements of yaw are not available on many spacecraft, making these systems highly susceptible to disturbances perturbing yaw. The current art uses a pitch-axis angular momentum bias to couple the roll and yaw axis dynamics, thereby improving yaw pointing through tight roll control. Further improvements in yaw pointing can be made if the disturbance torques are accurately predicted or estimated and counteracted by the actuators.

In addition to improved yaw pointing, knowledge of the disturbance torque environment can lead to better momentum management. Momentum wheels are used on many spacecraft to store accumulated momentum resulting from the disturbance torque environment. These wheels have a limited storage capacity, so many spacecraft use fuel-expending thrusters to unload momentum. Typically, the momentum unload is triggered whenever the wheel speed crosses a threshold. This is known as a momentum management strategy. If the disturbance torque profile is known in advance, the wheel speed trajectory can be predicted, which can be used for a fuel-efficient momentum management strategy.

SUMMARY OF THE INVENTION

The present invention is directed to a spacecraft embedded in a reference frame rotating relative to inertial space. In one embodiment, the spacecraft comprises actuators for maneuvering the spacecraft with respect to the reference frame, an attitude measurement device that measures the pitch and roll attitude of the spacecraft with respect to the reference frame, a control device adapted to keep the roll and pitch angles of the spacecraft close to the commanded roll and pitch angles, and a harmonic torque estimator adapted to read the commanded angular velocity of the spacecraft relative to an inertial frame, read momentum wheel speeds, read known predicted external torques and combines angular velocity, measured wheel speed and known external torque to produce an estimated observable periodic torque.

In one aspect, the present invention is directed to a spacecraft attitude control system. In one embodiment, the control system comprises a harmonic torque estimator adapted to estimate a periodic disturbance torque signal and a periodic momentum profile signal based on disturbances observable from the available spacecraft sensor. The system also includes an attitude profile generator adapted to provide reference attitude command and a rate command for the spacecraft to follow, a feedback control device adapted to measure roll and pitch angles to the commanded roll and pitch angles issued by the attitude profile generator and output a torque that is combined with the periodic disturbance torque estimate to form a momentum wheel torque command, and a momentum management device adapted to use the estimated periodic momentum profile to improve momentum management of the spacecraft.

In another aspect, the present invention is directed to a method of controlling a spacecraft. In one embodiment, the method includes measuring a pitch and roll attitude of the spacecraft, commanding the spacecraft actuators based on a pitch and roll attitude measurements in order to keep the roll and pitch angles close to desired roll and pitch angles, estimating a periodic observable torque, and feeding forward the estimated periodic torque to the spacecraft actuators in order to improve yaw pointing.

BRIEF DESCRIPTION OF THE DRAWINGS

The foregoing aspects and other features of the present invention are explained in the following description, taken in connection with the accompanying drawings, wherein:

FIGS. 5*a* and 5*b* are graphs of harmonic torque estimation incorporating features of the present invention.

DETAILED DESCRIPTION OF THE PREFERRED EMBODIMENT(s)

Figure 1:
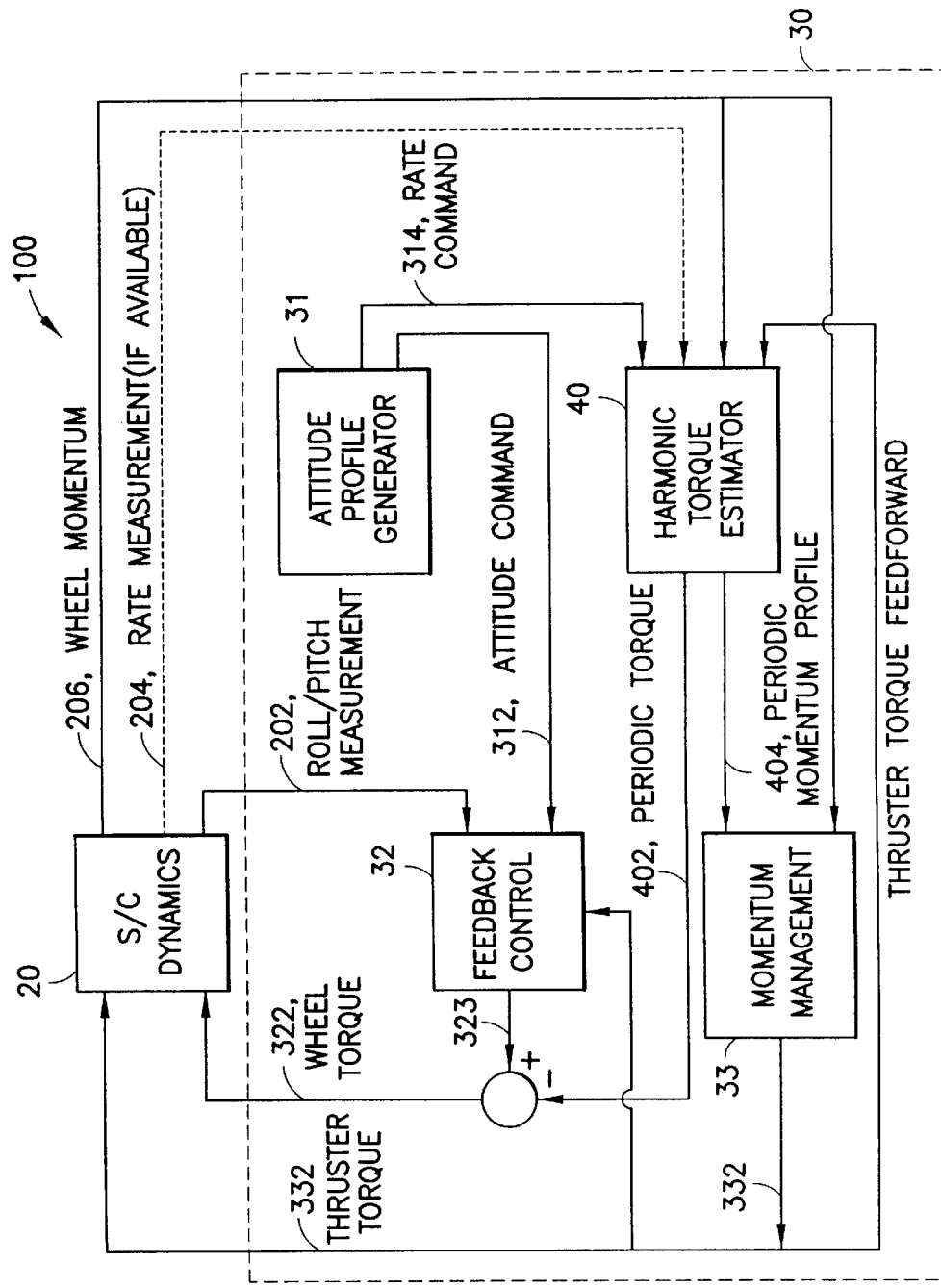
FIG. 1 is a block diagram of one embodiment of a control system for a satellite incorporating features of the present invention.

Referring to FIG. 1, a block diagram is shown illustrating a spacecraft control system 100 incorporating features of the present invention. Although the present invention will be described with reference to the embodiment shown in the drawings, it should be understood that the present invention could be embodied in many alternate forms of embodiments. In addition, any suitable size, shape or type of elements or materials could be used.

As shown in FIG. 1, the system 100 generally comprises a spacecraft plant or dynamic system 20 and an attitude control system 30. In alternate embodiments, the system 100 can include other suitable components for periodic torque estimation for improving for example, yaw pointing and momentum management of a spacecraft or satellite.

Figure 2:
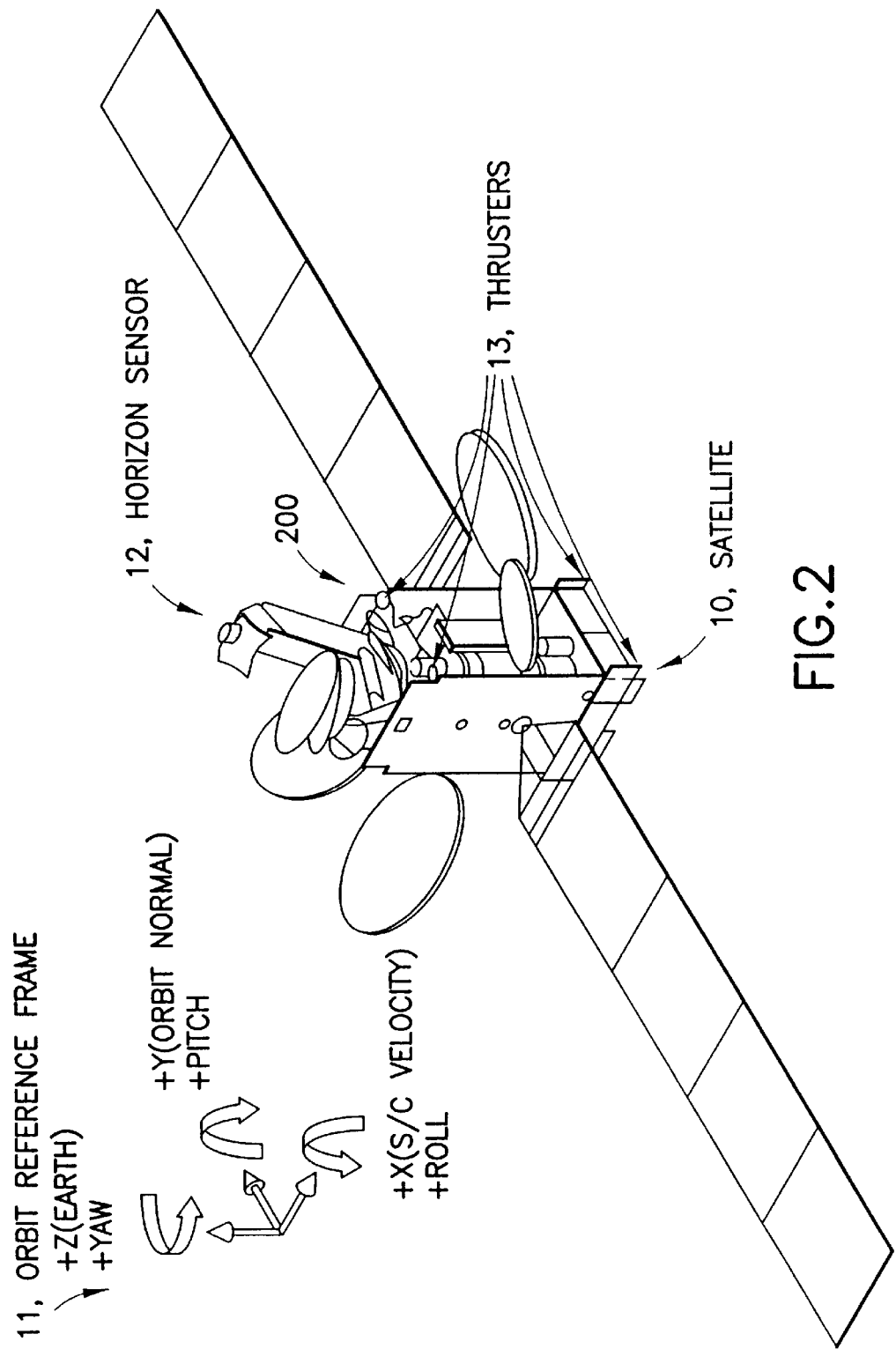
FIG. 2 is a diagram of an earth pointing spacecraft with an associated orbit reference frame.

Referring to FIG. 2, an Earth-pointing satellite 10 is illustrated within an orbit reference frame 11 having roll (x), pitch (y) and yaw (z) axes. The yaw axis (z) points towards the Earth center of mass. The roll axis (x) is perpendicular to the yaw axis, lying in the plane of the orbit in the direction of the spacecraft velocity. The pitch axis (y) completes a three-axis, right-hand orthogonal system, normal to the orbit plane. Frame 11 rotates with respect to inertial space. For a geostationary satellite, this frame would rotate about the pitch axis once every 23 hours and 56 minutes. Although the present invention is described with reference to an Earth-pointing satellite in an orbit reference frame, it can be generalized to a satellite fixed in any frame that rotates relative to inertial space.

Figure 3:
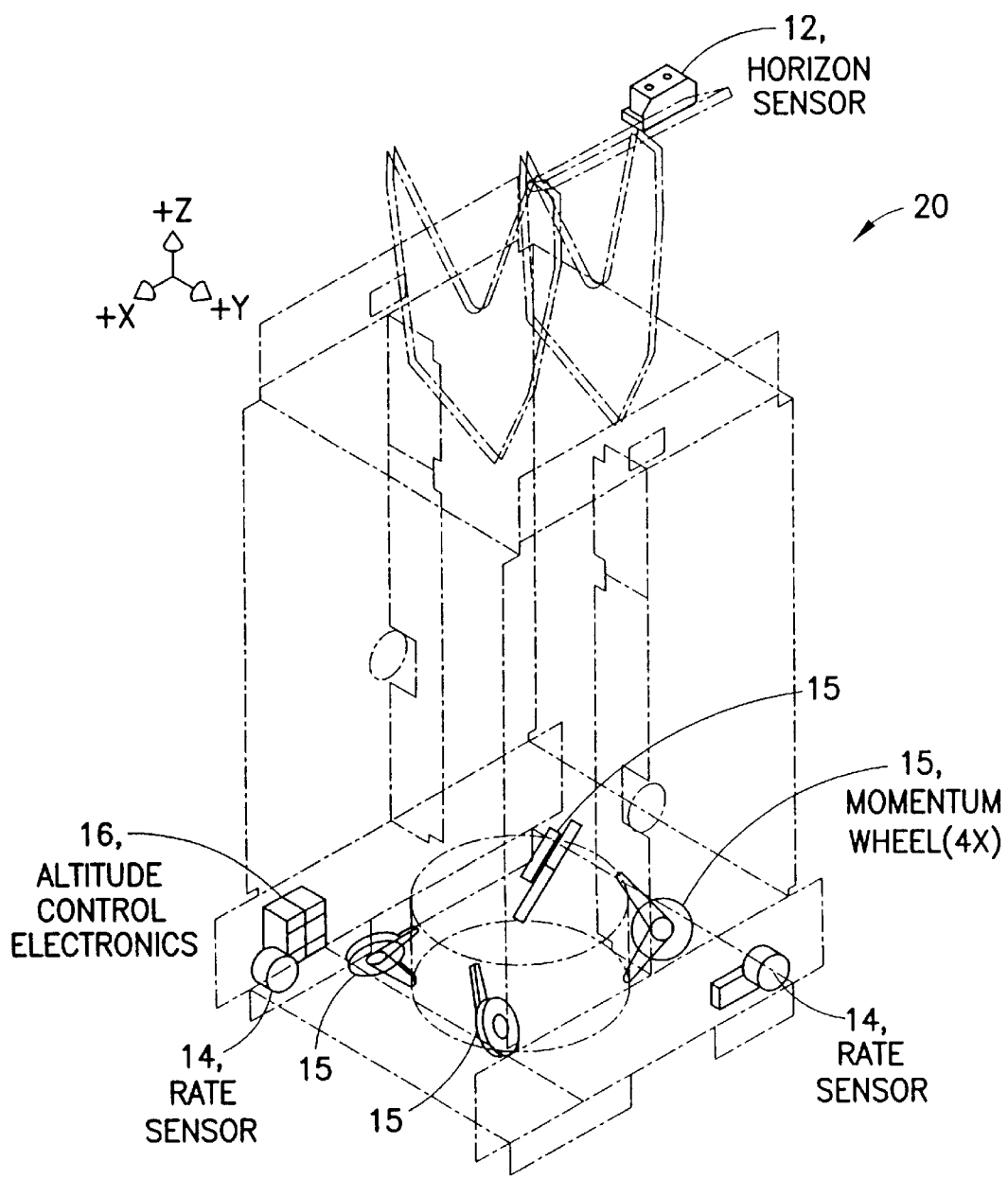
FIG. 3 is a schematic illustration of the spacecraft plant dynamics for a spacecraft incorporating features of the present invention.

The spacecraft plant or dynamic system 20 referred to in FIG. 1, generally comprises the physical hardware of the vehicle or spacecraft. The terms "spacecraft", "satellite" and "vehicle" will be used interchangeably herein, and generally refer to any orbiting satellite or spacecraft system. FIG. 3 is an example of one embodiment of the physical hardware comprising a plant or dynamic system 20 for a spacecraft.

As shown in FIG. 3, the dynamic system 20 can generally comprise a roll/pitch attitude sensor 12, one or more rate sensors 14, momentum wheels 15, and attitude control electronics 16. In one embodiment, the roll/pitch attitude sensor 12 could include an Earth sensor, and the rate sensor 14 could include ring laser gyros. The terms "roll/pitch attitude sensor" and "Earth sensor" will be used interchangeable herein, and generally refer to any sensor capable of measuring roll and pitch angles. The attitude control electronics 16 are generally adapted to run the control algorithms including the harmonic torque estimator. In one embodiment, the control electronics 16 can comprise a computer device.

Referring to FIGS. 2 and 3, the plant dynamics 20 also generally include a set of actuators, including thrusters 13 and momentum wheels 15. The spacecraft incorporating features of the present invention can generally include any suitable number of thrusters 13 and momentum wheels 15. For example, in one embodiment the spacecraft could comprise a three-wheel or four-wheel system.

Referring to FIG. 1, in one embodiment, the attitude control system 30 incorporating features of the present invention includes a harmonic torque estimator 40, an attitude profile generator 31 ("APG"), a feedback control device 32 ("FCC"), and a momentum management device 33 ("MM"). In alternate embodiments, the attitude control system 30 can include other suitable components for improved yaw pointing and momentum management based on periodic torque estimates.

As shown in FIG. 1, the spacecraft dynamics plant 20 is coupled to the attitude control system 30, including the harmonic torque estimator 40. The harmonic torque estimator 40 is generally adapted to estimate the diurnal torque environment and aid disturbance rejection. This is beneficial to yaw pointing, since yaw cannot be directly measured from the heritage suite of sensors found in the spacecraft dynamic system 20, such as for example, the earth sensor 12 and rate sensors 14.

The harmonic torque estimator 40 is generally adapted to estimate periodic body-fixed roll and yaw torques at the harmonics of a solar day. In one embodiment, the harmonic torque estimator 40 assumes that rate sensor measurements are not available and an earth sensor is the only measurement used for roll and yaw regulation. The harmonic torque estimator 40 can be augmented to accept rate sensor measurements when available. Torque observability plays a central role and only torque estimates that are updated are those that are observable from the available sensors.

The present invention makes the distinction between "observable" and "unobservable" periodic torques. The "observable" torques are considered the periodic torques which can be estimated without use of a rate sensor. In a momentum-biased system, these torques can account for 50% of the torques which perturb the spacecraft yaw. The "unobservable" torques are the remaining set of torques, and can be estimated with the use of a rate sensor.

It is a feature of the present invention to estimate only the disturbances that are observable from the available sensors of the spacecraft plant 20. The closed-loop system 100 shown in FIG. 1 generally restricts estimation to the observable subspace and provides tighter yaw pointing accuracies than were possible before.

Solar torques represent the dominant diurnal torque, although the spacecraft mass properties can also result in dynamical periodic torques, such as gravity-gradient torques. The total torque environment can be represented by a time-varying Fourier series with a one-day period, and coefficients that vary slowly over the course of a year. For the sake of simplicity, the harmonic torque estimator 40 described below estimates this torque environment out to second-order terms of the Fourier series. It is to be understood that in its general form, the harmonic torque estimator 40 can estimate the torque environment out to any number of terms. Since the pitch axis is completely observable and decoupled from the roll/yaw axes, the harmonic torque estimator 40 only estimates torques in the roll and yaw axes. The torques are modeled as:

$$T_x(t) = A_{x0}(t) + A_{x1}(t)\cos 2\pi t/P + B_{x1}(t)\sin 2\pi t/P + A_{x2}(t)\cos 4\pi t/P + B_{x2}(t)\sin 4\pi t/P$$

$$T_z(t) = A_{z0}(t) + A_{z1}(t)\cos 2\pi t/P + B_{z1}(t)\sin 2\pi t/P + A_{z2}(t)\cos 4\pi t/P + B_{z2}(t)\sin 4\pi t/P. \quad (1)$$

where P is the period of one day. The coefficients (i.e., $A_{x0}(t), \ldots, B_{z2}(t)$) change slowly over the course of a year, due to the changes in the solar torque profile as the orbit declination changes. These torques are carefully predicted prior to the spacecraft mission, and fed forward to the wheels as ground predictions. The harmonic torque estimator 40 is generally adapted to correct for any residual errors in the ground predictions. Estimation of the Fourier coefficients depends on their observability from the available sensors.

As shown in FIG. 1, the spacecraft dynamics 20 takes as inputs, the thruster torque 332 and wheel torque commands 322. The spacecraft dynamics 20 output roll and pitch measurements 202, rate measurements 204 when available, and the angular momentum 206 stored in the momentum wheels 15 of FIG. 3. The attitude profile generator 31 is generally adapted to provide a reference attitude command 312 and a rate command 314 for the spacecraft to follow.

The feedback control device 32 is generally adapted to control the spacecraft attitude to the commanded attitude 312 issued by the attitude profile generator 31. The feedback control device 32 outputs a torque 323 that is combined with a periodic disturbance torque estimate 402 to form a momentum wheel torque command 322. The periodic disturbance torque estimate 402 is a feed forward signal issued by the harmonic torque estimator 40.

The momentum management device 33 of FIG. 1 is generally responsible for managing the momentum stored in the wheels 15 of FIG. 3, which can be accomplished by thruster 13 firings. The momentum management device 33 is adapted to issue a thruster torque command 332 whenever the difference between the wheel momentum 206 and some nominal momentum value exceeds some threshold. The nominal value is generally based on the periodic momentum profile 404, provided by the harmonic torque estimator 40.

As shown in FIG. 1, the harmonic torque estimator 40 is adapted to deliver an estimated periodic disturbance torque signal 402 and an estimated periodic momentum profile signal 404. The estimated periodic disturbance torque signal 402 is fed forward to the actuators in the spacecraft dynamics 20 to improve the yaw pointing of the closed-loop system 100. The momentum management device 33 uses the estimated periodic momentum profile 404 to improve the momentum management of the spacecraft and thus, conserve thruster fuel.

To facilitate design of the estimator gains and understand observability of the torque environment, it is necessary to derive a linear model of the spacecraft. Actual implementation of the harmonic torque estimator 40 will be based on a nonlinear set of equations. The linear model derived below is based on a Nadir-pointing spacecraft (roll, pitch, and yaw angles equal to zero) in a circular orbit, with roll and yaw rates equal to zero, and pitch rate equal to $-\omega_o$, the spacecraft orbit rate. The harmonic torque estimator 40 generally measures harmonic torque from the body-fixed angular momentum dynamics. The angular momentum is a combination of the wheel momentum and spacecraft angular rate, defined as:

$$H^B = h + I\omega$$

where h is the angular momentum stored in the wheels, I is the moment of inertia, and $\omega$ is the angular rate. The superscript B indicates that $H_B$ is in the body-fixed frame. The angular momentum propagates in the body frame by the equation:

$$\dot{H}^B = -\omega \times H^B + T,$$

where T is the sum of all external torques. Assuming that the pitch axis rate is $\omega_y = -\omega_0$, then the roll and yaw angular momentum equations of motion are:

$$\begin{bmatrix} \dot{H}^B_x \\ \dot{H}^B_z \end{bmatrix} = \begin{bmatrix} 0 & \omega_0 \\ -\omega_0 & 0 \end{bmatrix} \begin{bmatrix} H^B_x \\ H^B_z \end{bmatrix} + \begin{bmatrix} 0 & h_y - I_y\omega_o \\ -h_y + I_y\omega_o & 0 \end{bmatrix} \begin{bmatrix} \omega_x \\ \omega_z \end{bmatrix} + \begin{bmatrix} T_x \\ T_z \end{bmatrix}. \quad (2)$$

For convenience, equation (2) is written as:

$$\dot{H}^B = A_H H + B_H \omega + T$$

where $H^B$ and $\omega$ are henceforth two-dimensional in the roll/yaw axes, and $A_H$ and $B_H$ are the matrices given in equation (2).

The periodic disturbance torque estimate can be represented by a linear system of oscillators:

$$\dot{\tau} = A_{st}\tau$$

$$T_{st} = C_{st}\tau \quad (3)$$

where $$A_{xt} = \begin{bmatrix} 0 & & & & & & & & & \\ & 0 & & & & & & & & \\ & & 0 & \omega_0 & & & & & & \\ & & -\omega_0 & 0 & & & & & & \\ & & & & 0 & \omega_0 & & & & \\ & & & & -\omega_0 & 0 & & & & \\ & & & & & & 0 & 2\omega_0 & & \\ & & & & & & -2\omega_0 & 0 & & \\ & & & & & & & & 0 & 2\omega_0 \\ & & & & & & & & -2\omega_0 & 0 \end{bmatrix} \quad (4)$$

$$C_{st} = \begin{bmatrix} 1 & 0 & 1 & 0 & 0 & 0 & 1 & 0 & 0 & 0 \\ 0 & 1 & 0 & 0 & 1 & 0 & 0 & 0 & 1 & 0 \end{bmatrix}$$

Combining the solar torque model with the momentum model yields a linear system:

$$\begin{bmatrix} \dot{H}^B \\ \dot{\tau} \end{bmatrix} = \begin{bmatrix} A_H & C_{st} \\ 0 & A_{st} \end{bmatrix} \begin{bmatrix} H^B \\ \tau \end{bmatrix} + \begin{bmatrix} B_H \\ 0 \end{bmatrix} \omega + \begin{bmatrix} T_{th} \\ 0 \end{bmatrix}.$$

where $T_{th}$ is the external torque environment, not including the harmonic torques. For practical purposes $T_{th}$ is the torque due to thruster firings. Note that momentum wheel control torques are not included in these equations, since these torques are internal and do not alter the total angular momentum $H^B$.

Using linear quadratic estimation theory or any other gain design method, an observer can be constructed with gain matrices $L_{Hg}$ and $L_\tau$, which outputs and estimated harmonic torque. The "g" subscripts on the observer gains indicate that these gain matrices were designed for an estimator using rate sensor measurements. The estimator equations are:

$$\begin{bmatrix} \dot{\hat{H}}^B \\ \dot{\hat{\tau}} \end{bmatrix} = \quad (5)$$

$$\begin{bmatrix} A_H & C_{st} \\ 0 & A_{st} \end{bmatrix} \begin{bmatrix} \hat{H}^B \\ \hat{\tau} \end{bmatrix} + \begin{bmatrix} L_{Hg} \\ L_{\tau g} \end{bmatrix} + \begin{bmatrix} h_x + I_x\omega_x - \hat{H}^B_x \\ h_z + I_x\omega_z - \hat{H}^B_z \end{bmatrix} + \begin{bmatrix} B_H \\ 0 \end{bmatrix}\omega + \begin{bmatrix} T_{th} \\ 0 \end{bmatrix}.$$

The harmonic torque estimate is then computed from:

$$\hat{T}_{st} = C_{st}\tau.$$

Notice that the observer equation (5) depends on the availability of a rate measurement $\omega$. Unless the spacecraft is designed to use a full-time rate sensor, these measurements will probably not be available for most of the spacecraft life. Unfortunately, it is not possible to propagate the body-fixed momentum without these measurements, and thus harmonic torque estimation via equation (5) cannot be done without a rate sensor. However, rather than propagating the momentum in the body-fixed frame, it is possible to propagate momentum in the earth-pointing frame without these measurements. Designating the earth-pointing frame as a frame which rotates about the pitch axis at the rate $-\omega_o$, then $H^E$ (momentum in the orbit frame) evolves as:

$$\dot{H}^E = A_H H^E + T$$

where $A_H$ is defined above. The difference between the earth-pointing fame and the body frame is subtle, but makes a big difference on what can be measured. In the earth-pointing frame, the roll/yaw angular momentum is:

$H_x^E = \cos\psi\cos\theta H_x^B + (\cos\psi\sin\theta - \sin\psi - \sin\psi\cos\phi) H_y^B + (\sin\phi + \cos\psi\sin\theta\cos\phi) H_z^B$ $H_z^E = \sin\phi H_x^B + \cos\theta\sin\phi H_y^B + \cos\theta\cos\theta H_z^B$.

Making small angle approximations, then:

$H_x^E \approx H_x^B - \psi H_y^B + \theta H_z^B$ $H_z^E \approx -\theta H_x^B + \phi H_y^B + H_z^B$.

The roll and pitch angles $\phi$, $\theta$ are directly measurable from the earth sensor, and thus $H_z^E$ can be calculated given $H^B$. However, the yaw angle $\psi$ is not observable, therefore $H_x^E$ is not available as a measurement. Making the approximation:

$$H^B \approx \begin{bmatrix} h_z \\ h_y - I_y\omega_o \\ h_t \end{bmatrix}$$

then $H_z^E$ can be approximately measured without a rate sensor. This approximation is very reasonable, since $I_{x\omega x}$ and $I_{z\omega z}$ tend to be fairly small compared to $h_x$ and $h_z$. Furthermore, assuming $\phi \approx \theta \approx 0$, then $H_z^E \approx h_z$.

This is the measurement approximation that will be used by the harmonic torque estimator 40.

Without a roll momentum measurement, a subspace of disturbance torques is unobservable from an earth sensor. The unobservable subspace of harmonic torques can be derived directly from the momentum in the earth-pointing frame. The Laplace transform of the measurement $H_z^E$ is:

$$H_z^E(s) = \frac{\omega_o T_x(s) - s T_z(s)}{s^2 + \omega_0^2}.$$

A necessary condition for state observability is $H_z^E(s) \neq 0$, thus torque unobservability is implied by:

$$H_z^E(s) = 0 \Leftrightarrow \omega_0 T_x(s) = s T_z \Leftrightarrow \omega_0 T_x(t) = \frac{d}{dt} T_z(t). \quad (6)$$

For a second-order periodic disturbance torque, the unobservable torques are defined by a linear subspace of the Fourier coefficients, derived by equations (1) and (6):

$A_{x0} = 0$ $A_{x1} = B_{z1}, A_{x2} = 2B_{z2}$ $B_{x1} = -A_{z1}, B_{x2} = -2A_{z2}$ (7)

Similarly, the orthogonal subspace defines the space of observable torques.

An orthogonal transformation matrix will transform the Fourier coefficients into observable and unobservable coefficients $C_{obsv}$ and $C_{unobsv}$.

$$\begin{bmatrix} C_{obsv} \\ \hline C_{unobsv} \end{bmatrix} = \begin{bmatrix} 1 & 0 & 0 & 0 & 0 & 0 & 0 & 0 & 0 & 0 \\ 0 & 0 & 0 & 1/\sqrt{2} & 1/\sqrt{2} & 0 & 0 & 0 & 0 & 0 \\ 0 & 0 & -1/\sqrt{2} & 0 & 0 & 1/\sqrt{2} & 0 & 0 & 0 & 0 \\ 0 & 0 & 0 & 0 & 0 & 0 & 0 & 1/\sqrt{5} & 2/\sqrt{2} & 0 \\ 0 & 0 & 0 & 0 & 0 & 0 & -1/\sqrt{5} & 0 & 0 & 2/\sqrt{5} \\ 0 & 1 & 0 & 0 & 0 & 0 & 1/\sqrt{5} & 0 & 0 & 0 \\ 0 & 0 & 1/\sqrt{2} & 0 & 0 & 1/\sqrt{2} & 0 & 0 & 0 & 0 \\ 0 & 0 & 0 & 1/\sqrt{2} & -1/\sqrt{2} & 0 & 0 & 0 & 0 & 0 \\ 0 & 0 & 0 & 0 & 0 & 0 & 2/\sqrt{5} & 0 & 0 & 1/\sqrt{5} \\ 0 & 0 & 0 & 0 & 0 & 0 & 0 & 2/\sqrt{5} & -1/\sqrt{5} & 0 \end{bmatrix} \begin{bmatrix} A_{x_0} \\ A_{z_0} \\ A_{x_1} \\ B_{x_1} \\ A_{z_1} \\ B_{z_1} \\ A_{x_2} \\ B_{x_2} \\ A_{x_2} \\ B_{x_2} \end{bmatrix}$$

The coefficients $C_{obsv}$ and $C_{unobsv}$ are defined as the observability basis, where $C_{obsv} = 0$ is equivalent to (7). For convenience, the transformation matrix is represented as:

$$M = \begin{bmatrix} M_o \\ M_u \end{bmatrix}.$$

This observability matrix is useful for decomposing the torque model (3) into observable and unobservable states, i.e., $$\begin{bmatrix} \tilde{\tau}_o \\ \tilde{\tau}_u \end{bmatrix} = \begin{bmatrix} M_o \\ M_u \end{bmatrix} \tau.$$

The orthonormal matrix M can be used as a similarity transformation for (3), with the state-space:

$$\dot{\tilde{\tau}}_o = M_o A_{st} M_o^T \tilde{\tau}_o$$

$$\dot{\tilde{\tau}}_u = M_u A_{st} M_u^T \tilde{\tau}_u$$

Without benefit of rate sensor measurements, only the observable torques can be included in the design model:

$$\begin{bmatrix} \dot{\hat{H}}^E \\ \dot{\tau}_o \end{bmatrix} = \begin{bmatrix} A_H & C_{st} M_o^T \\ 0 & M_o A_{st} M_o^T \end{bmatrix} \begin{bmatrix} \hat{H}^E \\ \tau_o \end{bmatrix} + \begin{bmatrix} T_{th} \\ 0 \end{bmatrix}$$

Using only the measurement of $h_z$, an observable harmonic torque estimator can be designed:

$$\begin{bmatrix} \dot{\hat{H}}^E \\ \dot{\hat{\tau}}_o \end{bmatrix} = \begin{bmatrix} A_H & C_{st}M_o^T \\ 0 & M_oA_{st}M_o^T \end{bmatrix} \begin{bmatrix} \hat{H}^E \\ \hat{\tau}_o \end{bmatrix} + \begin{bmatrix} L_{H_e} \\ L_{\tau_e} \end{bmatrix} (h_z - \hat{H}_z^E) + \begin{bmatrix} T_{sh} \\ 0 \end{bmatrix} \quad (8)$$

where $L_{H_e}$ and $L_{\tau_e}$ are estimator gain matrices designed using linear quadratic estimation theory or any other estimator gain design method. The subscript "e" is used to indicate the absence of rate sensor measurements, or "earth sensor only".

The linear realizations of the harmonic torque estimator (5) and (8) are used for gain design purposes only. A nonlinear implementation is more practical. Although not necessary, it is recommended that the Fourier coefficients of the harmonic torques be estimated, rather than the linear states τ. This modification to the estimator is simple to make, and is introduced below. The reason for directly estimating the. Fourier coefficients is because the Fourier coefficients ate expected to change very slowly over time, thus the dynamics of a "Fourier coefficient estimator" can be turned off for extended periods of time. The flexibility to turn the estimator off is desirable from an operations point of view, since there are times when the harmonic torque estimator 40 of FIG. 1 should not be running, e.g. during eclipse or thruster firings.

Figure 4:
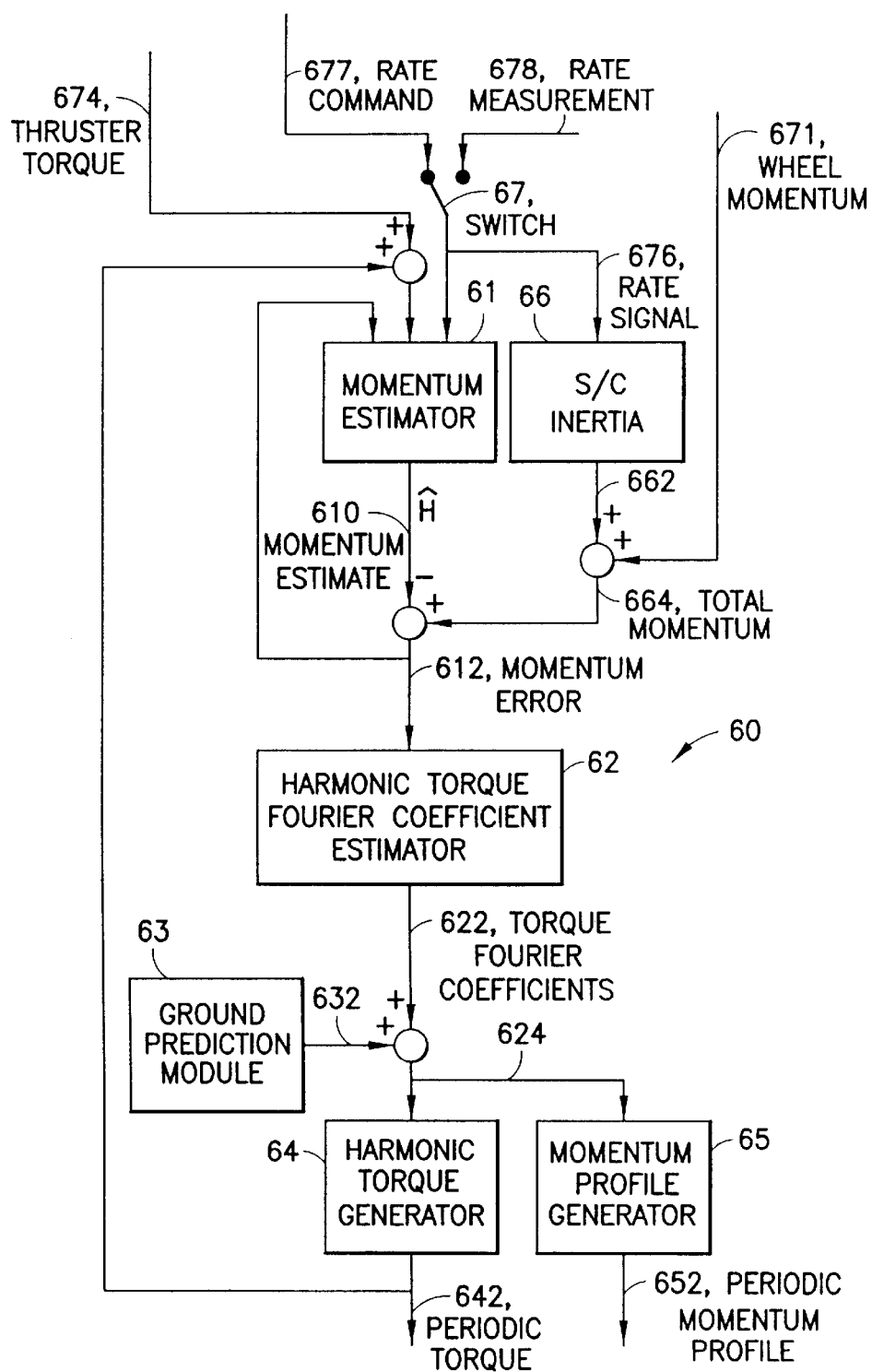
FIG. 4 is a block diagram of one embodiment of a harmonic torque estimator incorporating features of the present invention.
Figure 6A:
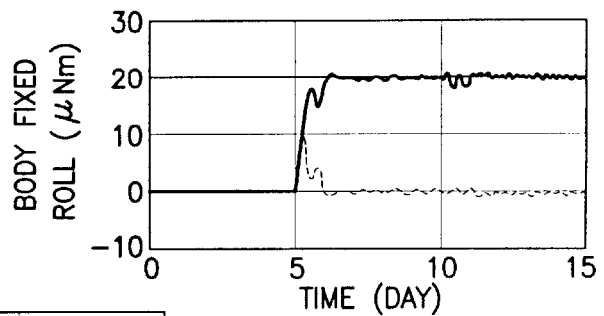
FIGS. 6*a*–6*e* and 7*a*–7*e* are graphs of the estimation of observability basis coefficients incorporating features of the present invention.
Figure 6B:
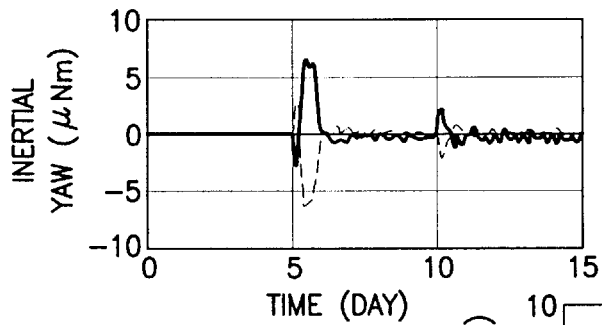
Figure 6C:
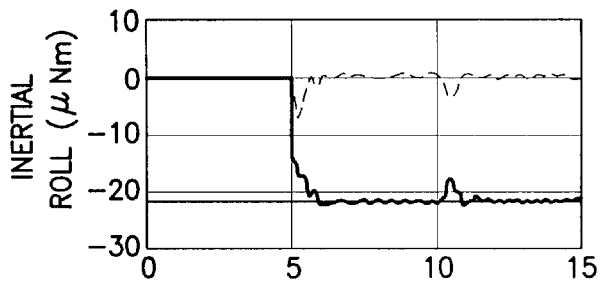
Figure 6D:
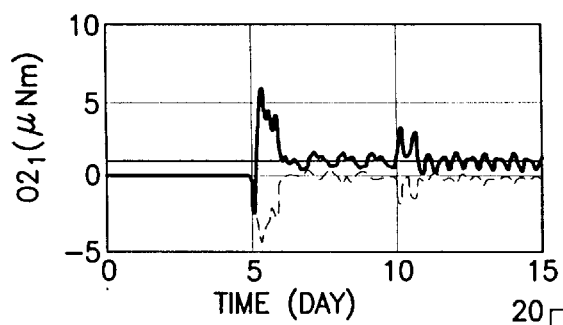
Figure 6E:
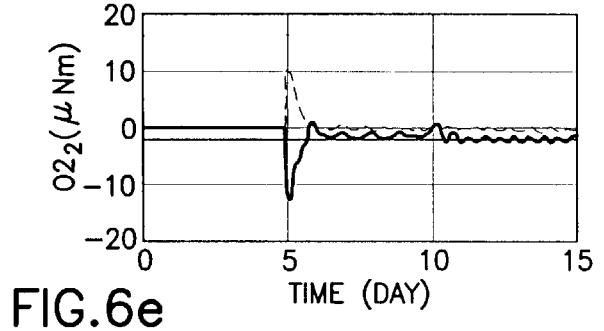
Figure 7A:
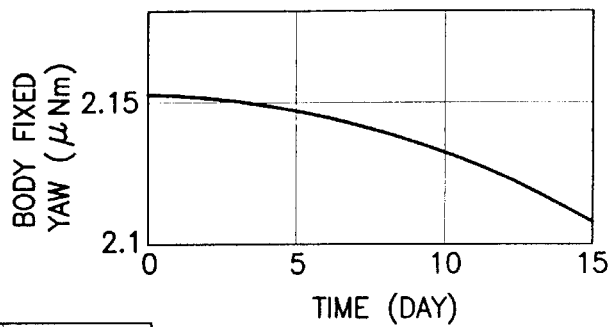
Figure 7B:
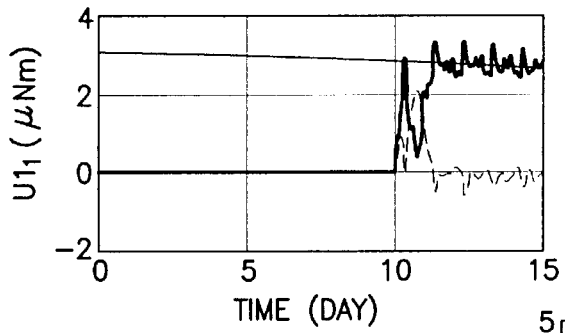
Figure 7C:
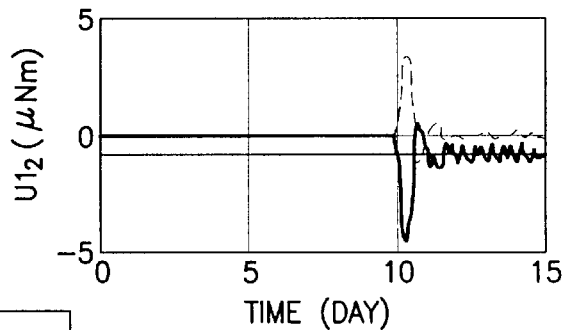
Figure 7D:
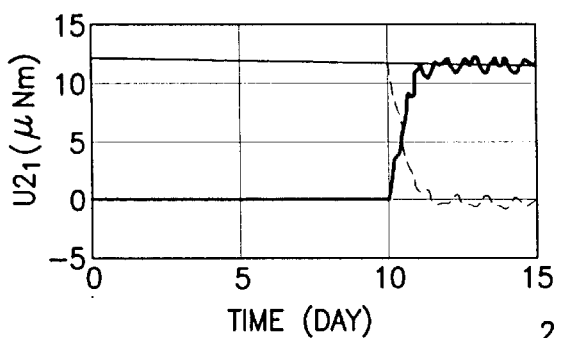
Figure 7E:
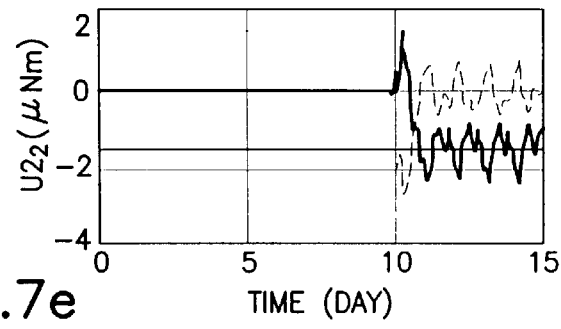

Referring to FIG. 4, a non-linear embodiment of a harmonic torque estimator 60 incorporating features of the present invention is illustrated. The harmonic torque estimator 60 generally comprises a momentum estimator ("ME") 61, a harmonic torque Fourier coefficient estimator 62 ("HTFCE"), a ground prediction module ("GPE") 63, a harmonic torque generator ("HTG") 64, a momentum profile generator ("MPG") 65, and a spacecraft inertia matrix 66.

The momentum estimator 61 is a dynamic estimator that estimates the body-fixed angular momentum stored in the satellite, including the momentum wheels 15. The momentum estimator is governed by the vector differential equation:

$$\dot{\hat{H}} = -\omega \times \hat{H} + T_{thruster} + T_{est} + L_H H_{err}$$

where ω is the rate vector signal 676, $T_{thruster}$ is a thruster torque vector signal 674, $H_{err}$ is the momentum error vector signal 612, and $T_{est}$ is the estimated periodic torque vector signal 642. The matrix $L_H$ is the momentum estimator gain matrix, designed based on the spacecraft mission requirements. The momentum estimator outputs a momentum estimate $\hat{H}$ 610, which is subtracted from the total momentum signal 664 to create the momentum error signal 612. The total momentum 664 is a combination of the wheel momentum 671 and the spacecraft angular momentum, found by multiplying the spacecraft inertia matrix 66 by the rate signal 676. Thus, the momentum error 612 is:

$$H_{err} = h_{meas} + I\omega - \hat{H}$$

where $h_{meas}$ is the wheel momentum measurement, and I is the spacecraft moment of inertia matrix.

The momentum error signal 612 is delivered to the harmonic torque Fourier coefficient estimator 62, which is a dynamic estimator outputting a set of estimated disturbance torque coefficients 622 for an Nth order Fourier series. The harmonic torque Fourier coefficient estimator is implemented individually for the roll and yaw axes, and each axis is governed by the equations:

$$\dot{a}_{o,axis} = L_{T0,axis}H_{err}$$

and $$\begin{bmatrix} \dot{a}_{n,axis} \\ \dot{b}_{n,axis} \end{bmatrix} = \begin{bmatrix} \cos 2\pi nt/P & -\sin 2\pi nt/P \\ \sin 2\pi nt/P & \cos 2\pi nt/P \end{bmatrix} L_{Tn,axis}H_{err}$$

for n=1 to N where $L_{Tn,axis}$ represents the harmonic torque Fourier coefficient estimator gain matrices for each axis and each n. The period P is the period of a solar day. The choice of integer N is specific to the spacecraft mission requirements. The harmonic torque Fourier coefficient estimator module 62 outputs a set of Fourier coefficients $a_{n,axis}$ and $b_{n,axis}$. The ground prediction module 63 outputs a set of predicted Fourier coefficients based on ground models of the solar torques. These are a set of Fourier coefficients specified as a function of sun declination, written as $\tilde{a}_{n,axis}(decl)$ and $\tilde{b}_{n,axis}(decl)$. The ground Fourier coefficients are combined with the set of Fourier coefficients 622, which are fed to the momentum profile generator 65 and harmonic torque generator 64. Finally, the harmonic torque generator 64 translates the coefficients into the estimated periodic disturbance torque 642 (signal 402 in FIG. 1) via the equation:

$$T_{est,axis} = A_{0,axis} + \sum_{n=1}^{N} [A_{n,axis}\cos 2\pi nt/P + B_{n,axis}\sin 2\pi nt/P]$$

where $$A_{n,axis} = a_{n,axis} + \tilde{a}_{n,axis}(decl)$$

$$B_{n,axis} = b_{n,axis} + \tilde{b}_{n,axis}(decl)$$

This estimated torque signal 642 is given in the rotating frame 11 of FIG. 2.

The momentum profile generator 65 integrates the periodic torques in orbit reference frame 11 of FIG. 2 to yield a momentum profile 652. (signal 404 in FIG. 1). The momentum profile generator 65 outputs only the periodic momentum components, and the non-periodic components (such as those induced by a constant inertial torque) are discarded. The roll and yaw momentum profile 52 generated by the momentum profile generator 65 is computed directly from the harmonic torque Fourier coefficients via $$\tilde{H}_x(t) = \frac{P}{2\pi}\left(A_{0,z} + \frac{A_{1,z} - B_{1,x}}{4}\cos 2\pi t/P + \frac{A_{1,x} + B_{1,z}}{4}\sin 2\pi t/P + \frac{-A_{2,z} - 2B_{2,x}}{3}\cos 4\pi t/P + \frac{2A_{2,x} - B_{2,z}}{3}\sin 4\pi t/P + \ldots\right)$$

$$\tilde{H}_z(t) = \frac{P}{2\pi}\left(A_{0,x} + \frac{-A_{1,x} - B_{1,z}}{4}\cos 2\pi t/P + \frac{A_{1,z} + B_{1,x}}{4}\sin 2\pi t/P + \frac{A_{2,x} - 2B_{2,z}}{3}\cos 4\pi t/P + \frac{2A_{2,z} + Bx}{3}\sin 4\pi t/P + \ldots\right)$$

Referring to FIGS. 1 and 4 the harmonic torque estimator 60 generally includes two modes of operation: (1) harmonic torque estimation with rate measurements and (2) harmonic torque estimation without rate measurements. The lack of rate measurements results in unobservability of certain disturbance torques.

The change from one mode to the other is implemented as a change in estimator gain matrices $L_H$ and $L_{Tn,axis}$ in the momentum estimator and harmonic torque Fourier coefficient estimator 62. Gain matrices $L_{Hg}$ and $L_{Tg}$ appearing in the linear estimator shown in Equation 5 can be used for mode (1), and the gain matrices $L_{He}$ and $L_{Te}$ appearing in the linear estimator shown in Equation 8 can be used for mode (2). The switch element 67 sets the rate source for the harmonic torque estimator 60, where rate measurements 678 (signal 204 in FIG. 1) are used during mode (1), and attitude profile generator rate commands 677 (signal 314 in FIG. 2) are used during mode (2). When operating in mode (1), all periodic disturbance torques (including constant torques) can be estimated. However, lack of rate measurements during mode (2) renders some of the disturbance torques unavailable. Mode (2) is capable of estimating only the observable torques. For a momentum-biased Earth-pointing satellite, 50% of the torques that perturb yaw are unobservable. The estimator gains matrices $L_H$ and $L_{Tn,axis}$ in the momentum estimator 61 and harmonic torque Fourier coefficient estimator 62 must be designed with this lack of observability in mind. For example, in mode (2), the rows of $L_H$ and $L_{Tn,axis}$ corresponding to the roll momentum error must be zero, since there does not exist a valid roll momentum measurement.

Estimation of all periodic torques under mode (1) assumes an unbiased rate measurement However, many rate measurement devices do contain a small bias, sometimes referred to as "drift", which will result in an erroneous constant yaw torque estimate. This problem can be bypassed by passing the rate measurement through a high-pass filter. However, this comes at the expense of making the harmonic torque estimator 60 unable to estimate a constant yaw torque.

Figure 8:
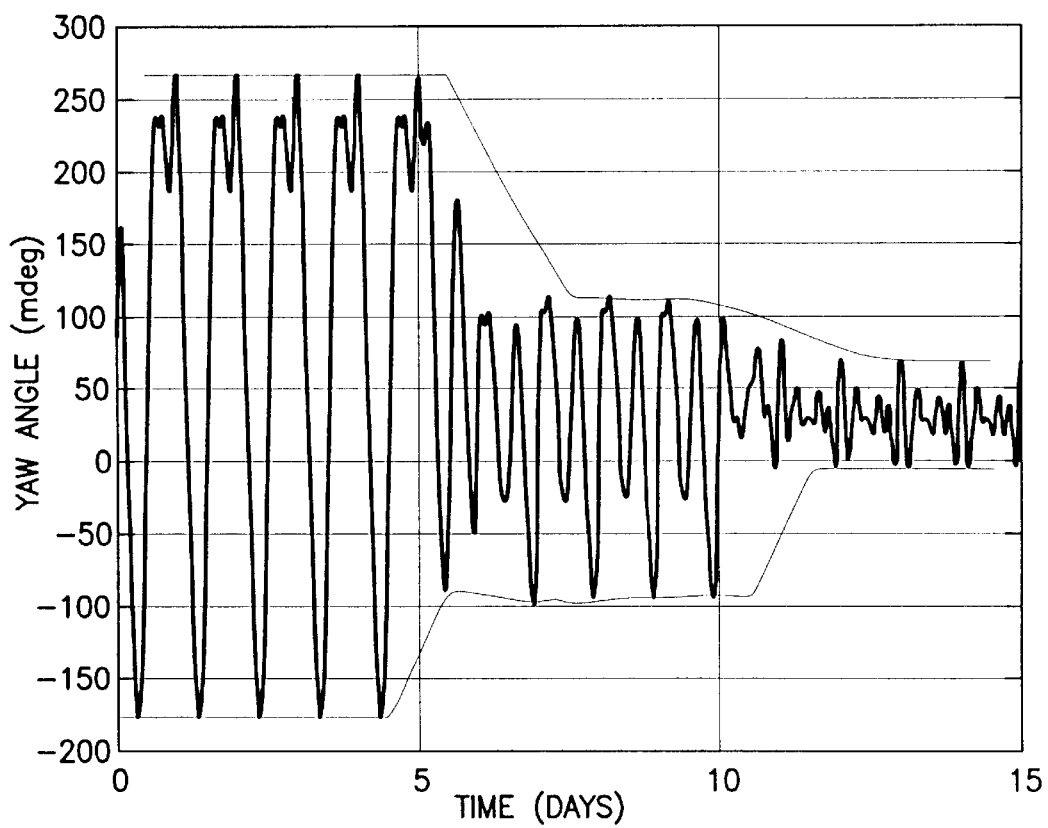
FIG. 8 is a graph of yaw pointing during harmonic torque estimation incorporating features of the present invention.

FIGS. 5a and 5b illustrates the performance of the harmonic torque estimator 70 in simulation over a period of 15 days. FIG. 5a illustrates yaw torque and FIG. 5b illustrates roll torque. The solar torques are representative of a geosynchronous satellite near winter solstice, and the ground predictions are set to zero. For the first five days, no solar torque estimation is performed. Between days five and ten, only the observable torques are estimated without the aid of rate measurements. Finally, the entire harmonic torque is estimated for days ten through fifteen. Rate sensor measurements were filtered with a $\omega_o/10$ rad/sec first-order high pass filter to remove drift. FIGS. 6a–6e shows the observability basis coefficients of the solar torque, with the corresponding estimated values shown in FIGS. 7a–7e. The observable coefficients, which are estimated starting at day five, are shown in (FIGS. 6a–6e). The unobservable coefficients, estimated starting at day ten, are shown in FIGS. 7a–7e. Note that the body-fixed yaw torque (shown in FIG. 7a) is not estimated since it is completely unobservable due to gyro drift. FIG. 8 shows the yaw pointing for this simulation, which clearly shows the yaw pointing improvement.

Figure 9:
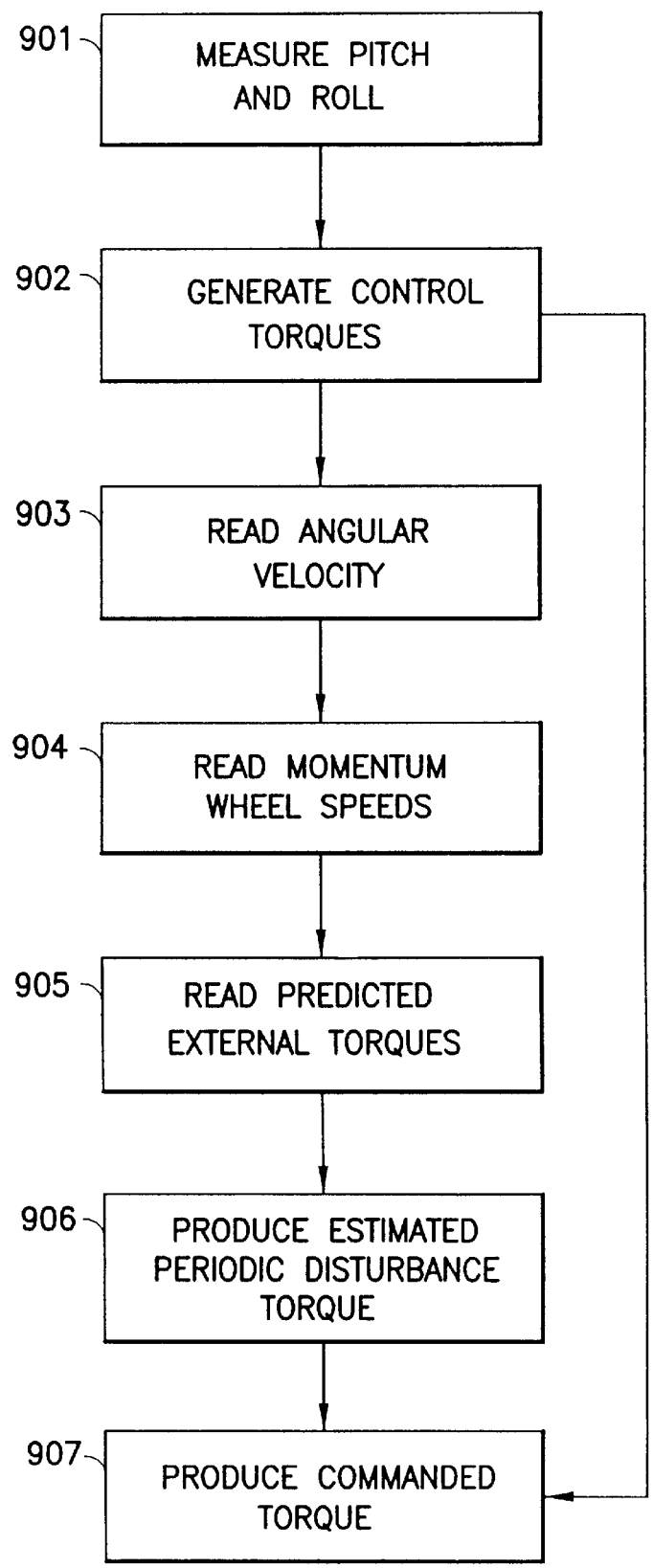
FIG. 9 is a flow chart for one embodiment of a method incorporating features of the present invention.

Referring to FIG. 9, a flow chart of one embodiment of method for controlling a spacecraft incorporating features of the present invention is shown. Generally, the spacecraft roll and pitch angles are actively controlled to a set of commanded roll and pitch angles, and yaw errors are minimized by feeding forward an estimated periodic torque environment. As shown in FIG. 9, the method includes measuring 901 the spacecraft's pitch and roll attitude and generating 902 a control torque designed to keep the spacecraft attitude close to commanded roll and pitch angles. The generated control torques are based on pitch and roll measurements and commanded pitch and roll angles. The harmonic torque estimator includes steps for reading 903 the angular velocity of the spacecraft relative to an inertial frame (measured if rate measurements available, commanded otherwise), reading 904 the momentum wheel sensor outputs as wheel speeds, reading known predicted external torques 905 and combining 906 angular velocity, wheel momentum and known external or predicted torques for producing an estimated periodic disturbance torque. The method also includes combining 907 the control torque (from step 902) and the estimated periodic disturbance torque (from step 906) to produce a commanded torque for the spacecraft actuators.

The present invention may also include software and computer programs incorporating the process steps and instructions described above that are executed in different computers. For example, referring to FIG. 1, each of the devices described therein could be part of a computer system or systems, such that the computers are capable of sending information to each other and receiving information from each other. The computers incorporating features of the present invention are generally adapted to utilize program storage devices embodying machine readable program source code which is adapted to cause the computers or system to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include semiconductor materials and chips.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A spacecraft embedded in a reference frame rotating relative to inertial space comprising:
    actuators for maneuvering the spacecraft with respect to the reference frame;
    an attitude measurement device that measures the pitch and roll attitude of the spacecraft with respect to the reference frame;
    a control device adapted to keep the roll and pitch angles of the spacecraft close to the commanded roll and pitch angles; and
    a harmonic torque estimator adapted to read the commanded angular velocity of the spacecraft relative to an inertial frame, read momentum wheel speeds, read known predicted external torques and combine angular velocity, measured wheel speed and known external torque to produce an estimated observable periodic torque.

2. The spacecraft of claim 1 including a rate measurement device wherein the control device estimates both observable and unobservable periodic torque while the onboard rate measurement device is ON.

3. The spacecraft of claim 1 including a momentum storage device providing a non-zero average momentum perpendicular to the orbital plane.

4. The spacecraft of claim 3 including a rate measurement device wherein the control device estimates both observable and unobservable periodic torque while the onboard rate measurement device is ON.

5. The spacecraft of claim 1 wherein momentum stored in momentum wheels is kept close to ideal periodic momentum trajectory.

6. An attitude control system for a spacecraft comprising:
    a harmonic torque estimator adapted to estimate a periodic disturbance torque signal and a periodic momentum profile signal based on disturbances observable from the available spacecraft sensors;

an attitude profile generator adapted to provide reference attitude command and a rate command for the spacecraft to follow;

a feedback control device adapted to measure roll and pitch angles to the commanded roll and pitch angles issued by the attitude profile generator and output a torque that is combined with the periodic disturbance torque estimate to form an actuator torque command; and a momentum management device adapted to use the estimated periodic momentum profile to improve momentum management of the spacecraft.

7. The attitude control system of claim 6 wherein in the step of combining the periodic disturbance torque signal estimate is a feed forward signal issued by the harmonic torque estimator.

8. The attitude control system of claim 6 wherein the periodic disturbance torque signal estimate is fed forward to actuators in the spacecraft dynamic system to improve yaw pointing.

9. The attitude control system of claim 6 wherein the harmonic torque estimator is adapted to measure harmonic torque from body-fixed angular momentum dynamics, wherein the angular momentum is a combination of wheel momentum and spacecraft angular rate.

10. The attitude control system of claim 6 wherein the harmonic torque estimator is adapted to measure observable harmonic torque from body-fixed angular momentum dynamics, wherein the angular momentum is estimated without rate sensor measurements.

11. The attitude control system of claim 6 wherein spacecraft roll and pitch angles are measured from an earth sensor.

12. The attitude control system of claim 6 wherein the momentum management device is further adapted to issue a thruster torque command when a difference between wheel momentum and a predetermined nominal wheel momentum value exceeds a threshold level, the predetermined nominal value being based on the periodic momentum profile provided by the harmonic torque estimator.

13. The attitude control system of claim 6 wherein the harmonic torque estimator further comprises:

a momentum estimator adapted to estimate a body-fixed angular momentum stored in the satellite and generate a momentum error signal;

a harmonic torque Fourier coefficient estimator adapted to output a set of estimated disturbance torque Fourier coefficients for each of the roll and yaw axes developed from the momentum error signal to the momentum profile generator and harmonic torque generator; and a harmonic torque generator adapted to translate the estimated disturbance torque Fourier coefficients delivered from the harmonic torque Fourier coefficient estimator into the estimated periodic torque.

14. The attitude control system of claim 13 wherein the harmonic torque estimator further comprises a ground prediction module adapted to output a set of predicted Fourier coefficients based on ground models of solar torques to be combined with the set of Fourier coefficients fed to a momentum profile generator and harmonic torque generator.

15. The attitude control system of claim 13 wherein the harmonic torque estimator further comprises a momentum profile generator adapted to integrate the periodic torques to yield a periodic roll and yaw momentum profile.

16. A method of controlling a spacecraft comprising the steps of:

measuring a pitch and roll attitude of the spacecraft;

generating a control torque command designed to keep the roll and pitch angles close to desired roll and pitch angles; and estimating an observable periodic disturbance torque by combining a measured angular velocity, measured wheel speed and known external torques; and combining the generated control torque command and the estimated observable periodic torque to produce an actuator torque command.

17. The method of claim 16 wherein inclusion of the periodic torque in the actuator torque improves yaw pointing.

18. The method of claim 16 further comprising the step of using a harmonic torque estimator to produce the estimated periodic torque.

19. The method of claim 16 wherein the step of estimating an observable periodic torque further comprises the steps of:

reading a commanded angular velocity of the spacecraft relative to an inertial frame;

reading momentum wheel speeds;

reading known predicted external torques; and combining the angular velocity, wheel momentum and known external torques to produce the estimated observable periodic torque.

20. The method of claim 16 wherein the step of estimating a periodic torque further comprises the steps of:

reading an angular velocity measurement devices;

reading momentum wheel speeds;

reading known predicted external torques; and combining the angular velocity, wheel momentum and known external torques to produce the estimated observable periodic and unobservable torques.

21. A method of controlling a spacecraft comprising the steps of:

measuring a pitch and roll attitude of the spacecraft;

generating a control torque command designed to keep roll and pitch angles close to desired roll and pitch angles;

estimating Fourier coefficients of a periodic disturbance torque and evaluating a Fourier series of the estimated Fourier coefficients to produce an estimated periodic torque; and combining the generated control torque command and the estimated periodic torque to produce an actuator torque command.

22. The method of claim 21 wherein the step of estimating Fourier coefficients of a periodic torque comprises the steps of:

reading a commanded angular velocity of the spacecraft relative to an inertial frame;

reading momentum wheel speeds;

reading known predicted external torques;

combining the angular velocity, wheel momentum and known external torques to produce the estimated Fourier coefficients of the periodic torque; and wherein the estimated Fourier coefficients include only those coefficients that can be estimated without an angular velocity sensor.

23. The method of claim 21 wherein the step of estimating Fourier coefficients of a periodic torque further comprises the steps of:

reading an angular velocity measurement;

reading momentum wheel speeds;

reading known predicted external torques;

combining the angular velocity, wheel momentum and known external torques to produce the estimated Fourier coefficients of the periodic torque; and wherein any Fourier coefficient may be estimated, including those coefficients that cannot be estimated without an angular velocity sensor.

* * * * *